(12) United States Patent
Schmidt et al.

(10) Patent No.: US 8,901,047 B2
(45) Date of Patent: Dec. 2, 2014

(54) BINDERS FOR BINDING BEDS AND LOOSE FORMATIONS AND PROCESSES FOR PRODUCING THEM

(75) Inventors: Christian Schmidt, Saarbruecken (DE); Helmut Schmidt, Saarbruecken-Guedingen (DE)

(73) Assignee: EPG (Engineered Nanoproducts Germany) AG, Zweibruecken (DE)

( * ) Notice: Subject to any disclaimer, the term of this patent is extended or adjusted under 35 U.S.C. 154(b) by 893 days.

(21) Appl. No.: 12/918,498

(22) PCT Filed: Feb. 26, 2009

(86) PCT No.: PCT/EP2009/052273
§ 371 (c)(1),
(2), (4) Date: Oct. 13, 2010

(87) PCT Pub. No.: WO2009/106562
PCT Pub. Date: Sep. 3, 2009

(65) Prior Publication Data
US 2011/0039737 A1    Feb. 17, 2011

(30) Foreign Application Priority Data
Feb. 27, 2008   (DE) .................. 10 2008 011 413

(51) Int. Cl.
| | |
|---|---|
| C09K 8/528 | (2006.01) |
| C07F 9/90 | (2006.01) |
| C09K 8/80 | (2006.01) |
| C09K 8/575 | (2006.01) |
| C04B 28/00 | (2006.01) |
| C09K 8/56 | (2006.01) |
| C09K 17/36 | (2006.01) |
| C04B 28/24 | (2006.01) |
| C04B 103/00 | (2006.01) |
| C04B 111/00 | (2006.01) |

(52) U.S. Cl.
CPC ......... *C09K 17/36* (2013.01); *C04B 2103/0067* (2013.01); *C09K 8/80* (2013.01); *C09K 8/5751* (2013.01); *C04B 28/005* (2013.01); *C09K 8/56* (2013.01); *C04B 28/24* (2013.01); *C04B 2111/00724* (2013.01); *C07B 26/30* (2013.01)
USPC .......................................... 507/224; 524/382

(58) Field of Classification Search
CPC .......... C09K 8/80; C09K 8/685; C09K 8/512; C09K 8/887; C02F 5/08; C02F 5/12
USPC ............ 507/224, 234, 271; 524/382; 427/384
See application file for complete search history.

(56) References Cited

U.S. PATENT DOCUMENTS

| | | | | |
|---|---|---|---|---|
| 3,449,293 | A * | 6/1969 | Martin et al. ................ | 528/23 |
| 6,257,335 | B1 * | 7/2001 | Nguyen et al. ............ | 166/280.2 |
| 7,825,074 | B2 * | 11/2010 | Schmidt et al. ............... | 507/234 |
| 2005/0127550 | A1 | 6/2005 | De Bruyn et al. | |
| 2007/0158070 | A1 | 7/2007 | Endres et al. | |
| 2009/0233818 | A1 | 9/2009 | Schmidt et al. | |
| 2009/0250218 | A1 | 10/2009 | Akarsu et al. | |
| 2009/0264323 | A1 | 10/2009 | Altherr et al. | |

FOREIGN PATENT DOCUMENTS

| | | | | |
|---|---|---|---|---|
| DE | 102004004615 | A1 | 8/2005 | |
| DE | WO2006/077125 | * | 7/2006 | ............... C09K 8/57 |
| DE | 102006018938 | A1 | 10/2007 | |
| DE | 102006018939 | A1 | 10/2007 | |

\* cited by examiner

*Primary Examiner* — Susannah Chung
*Assistant Examiner* — Atnaf Admasu
(74) *Attorney, Agent, or Firm* — Abel Law Group, LLP.

(57) ABSTRACT

A binder is described which comprises A) a hydrolysate or heterocondensate of at least one hydrolysable silicon compound and at least one metal, phosphorus or boron compound, the metal being selected from Al, Ge, Sn, Pb, Ti, Mg, Li, V, Nb, Ta, Zr and Hf, B) an organic polymerizable or polycondensable monomer or oligomer and C) a buffer, so that the pH of the buffered binder is in the range from 2 to 7, and optionally a complexing agent, if appropriate, the at least one hydrolysable silicon compound comprising one or more hydrolysable silicon compounds having at least one nonhydrolysable group or oligomers thereof. The binder is suitable for consolidating bulk or loose substrates.

33 Claims, No Drawings

BINDERS FOR BINDING BEDS AND LOOSE FORMATIONS AND PROCESSES FOR PRODUCING THEM

BACKGROUND OF THE INVENTION

1. Field of the Invention

The invention relates to a binder, methods for binding bulk materials and loose formations with this binder and bound products produced therewith.

2. Discussion of Background Information

Binders for binding bulk materials and loose formations are known. Thus, for example, DE-A-102004004615, EP-A-06706316, WO 2007/121972 and WO 2007/121975 describe systems which are used for consolidating bulk materials or loose formations. As a rule, a procedure is adopted in which a reactive soluble system is infiltrated into a bulk material or loose formation and is solidified via a reaction. Various materials are used for this purpose, for example organic monomers, hydrolysable and condensed alkoxides which are activated via sol-gel reactions, or mixtures of the two.

What is of decisive importance is that the solidification or curing reaction starts only when the infiltration process is complete. Otherwise, there is the danger that the binder will block, for example, feed lines or will solidify on the surface of the bulk material to be infiltrated and will not penetrate into the bulk material. The setting behaviour of the binder must therefore be adjusted so that solidification begins reliably only when the infiltration is complete or when a part of the binder is washed out or blown out again by a further step in order to maintain porosity.

In order to achieve this, the kinetics of the setting process must be well known and must be capable of being established in an exactly reproducible manner. For example, free radical polymerization mechanisms which have a known initial period are suitable for this purpose. It has been found, for example, that thermally initiatable peroxides are suitable as free radical formers. Pure sol-gel systems are also suitable but they show a strong dependence on external boundary parameters, such as, for example, pH and water content. These are so-called "living systems" whose stability declines with time so that they are frequently not particularly suitable for specific technical purposes.

The abovementioned prior art describes systems which were intended for the consolidation of bulk materials or loose formations. Mixed systems comprising sol-gel compositions, organic monomers or oligomers having reactive double bonds and initiators based on peroxides are described. The peroxides are chosen so that, after reaching the initiation temperature, a certain time elapses before a significant effect is found in respect of an increased viscosity of the system. The initiation temperature is the temperature at which the decomposition rate of the peroxides is sufficient for starting a polymerization chain reaction.

In this way, for example, a monomer solution which is provided with a corresponding initiator can be infiltrated into a bulk material which is kept at a specified temperature, and the consolidation can be induced after a specified time via the initial period peculiar to the initiator. Exact tailoring of the predetermined temperature of the bulk material, the decomposition temperature of the initiator and a knowledge of the enthalpy of reaction is required in order to avoid so-called "run-away" of the reaction and, as a result of this, consolidation at too early a stage.

However, the abovementioned prior art does not discuss the effect of finely divided components on the course of the chain or solidification reaction or take this into account. Thus, in our own investigations, it was found that finely divided components, e.g. phyllosilicates or milled ceramic components or oxides (clay minerals, $Al_2O_3$, $ZrO_2$, $Fe_2O_3$, earthenware or stoneware), lead to early initiation of free radical formation from peroxide initiators, presumably due to catalytic effects at corners and edges of very fine particles present in the system. Thus, the addition of very fine oxide particles, such as fine clay minerals and finely milled ceramic particles, reduced the "open" time (time to gel formation or an increase in viscosity by several powers of ten) from about 4 hours to about 1 hour. Since no statement can be made about the presence, the type, the amount and the activity of such particles, particularly in natural formations which are to be bound, the presence of such particles in the systems to be bound is also an obstacle to the use of such binder systems in practice.

Systems described in WO 2007/121972 and WO 2007/121975 are scarcely suitable in practice owing to the abovementioned problems.

It was therefore the object to provide a binder which is suitable for binding bulk materials of all kinds or geological formations and ensures that it is not impaired in its mode of action by active surfaces of very fine particles, in particular with regard to the "open" time explained above. In particular, this should be achieved for binders with free radical initiators, such as peroxide initiators, on use of the above-described principle of free radical polymerization with a delayed action after the infiltration of bulk materials.

In addition, with the simultaneous use of polycondensable alkoxides, in particular with the use or concomitant use of silanes, the influence of the pH on the condensation process is considerable. This results in the danger that an influence, for example relating to the bulk material or formation, on the pH likewise has an influence on the open time. This too is not discussed in the above prior art.

It has now surprisingly been found that, by buffering reaction mixtures comprising precondensed sol-gel systems and organic binder components, such as monomers, with a buffer solution, in particular comprising an organic acid and a conjugated base, such as an acetic acid/acetate buffer, no influence at all of very fine particles on the properties of the binder is observable.

SUMMARY OF THE INVENTION

The present invention provides a binder for binding bulk materials and loose formations. The binder comprises
  (A) a hydrolysate and/or a heterocondensate of at least one hydrolyzable silicon compound and at least one metal, phosphorus or boron compound, the metal being selected from Al, Ge, Sn, Pb, Ti, Mg, Li, V, Nb, Ta, Zr and Hf,
  (B) at least one organic polymerizable or polycondensable monomer or oligomer,
  (C) a buffer to adjust the pH of the binder to a value of from 2 to 7, and, optionally, a complexing agent.

In one aspect of the binder, the at least one hydrolyzable silicon compound may comprise one or more hydrolyzable silicon compounds that have at least one nonhydrolyzable group, and/or oligomers thereof.

In another aspect, the at least one nonhydrolyzable group may be free of polymerizable units. For example, the at least one nonhydrolyzable group of the hydrolyzable silicon compound may comprise an alkyl group and/or an aryl group.

In yet another aspect of the binder of the present invention, the buffer may comprise a carboxylic acid and the conjugated base of the carboxylic acid. For example, the buffer may comprise an acetic acid/acetate buffer.

In a still further aspect of the binder, the buffer may comprise a complexing agent selected from organic acids and chelating agents.

In another aspect, component (B) of the binder may comprise a group that is capable of free radical polymerization.

In another aspect, the metal or boron compound may comprise a complex ligand or (A) may have been formed in the presence of a complex ligand.

In yet another aspect of the binder, the metal, phosphorus or boron compound may comprise at least one compound of one of B, Al, Sn, Ti, and Zr. For example, the metal, phosphorus or boron compound may comprises at least one Ti compound.

In another aspect, the molar ratio of Si atoms to metal, phosphorus and boron atoms in the binder may be from 10:1 to 1:3.

In another aspect, component (A) may be based on at least one hydrolyzable silicon compound having a nonhydrolyzable organic group without a polymerizable unit and at least one hydrolyzable silicon compound without nonhydrolyzable groups.

In another aspect, the binder may comprise a polymerization initiator. For example, the polymerization initiator may comprise a free radical initiator such as, e.g., a peroxide and/or an azo compound.

In another aspect, the binder may further comprise a solvent and/or an additive.

In another aspect, the binder may comprise a heterocondensate which is a metallo-, phosphoro- or borosiloxane and contains (i) units of heteroatoms selected from P, B, Al, Ge, Sn, Pb, Ti, Mg, Li, V, Nb, Ta, Zr and Hf that are incorporated into a siloxane skeleton via oxygen bridges, and (ii) siloxane units in which the silicon atom optionally has a nonhydrolyzable organic group without a polymerizable unit.

In another aspect, the weight ratio of heterocondensate to organic binder component, based on the cured binder, may be from 95:5 to 5:95.

In yet another aspect, component (A) of the binder may have been prepared in at least two stages, one or more hydrolyzable compounds having a relatively lower hydrolysis reactivity being prehydrolyzed in a first stage to afford a prehydrolyzate and one or more hydrolyzable compounds having a relatively higher hydrolysis reactivity being added to the prehydrolyzate in a final stage.

In a still further aspect of the binder of the present invention, for preparing component (A) the at least one hydrolyzable silicon compound may have been mixed with water for hydrolysis, and the metal, phosphorus or boron compound may have been added to a reaction mixture obtained after the water has been substantially consumed.

In another aspect, the binder may be present as a sol and/or may be particle-free and/or may comprise a polysiloxane having at least one reactive group.

The present invention also provides a method for consolidating a bulk or loose substrate. The method comprises mixing and/or infiltrating the substrate with the binder of the present invention as set forth above (including the various aspects thereof) and then curing the binder.

In one aspect of the method, the substrate may comprise at least one of a geological formation, grit, a bulk material, soil, and rock.

In another aspect, following the curing of the substrate, the substrate may be sealed, voids in the substrate being completely or substantially completely filled with the binder.

In yet another aspect of the method, voids in the substrate may remain completely or partly open on consolidation, so that a permeability of unbound substrate is at least partly retained in a consolidated substrate.

In another aspect, the substrate may be freed from impurities by the binder.

In a still further aspect of the method, the binder may be cured thermally.

The present invention also provides a molded article. The article comprises a finely divided, pulverulent or granular substrate that is bound with the cured binder of the present invention as set forth above (including the various aspects thereof).

In one aspect, the article may be a porous article.

In another aspect, the cured binder may comprise an IPN polymer.

DETAILED DESCRIPTION OF THE INVENTION

The binder according to the invention surprisingly has an open time which has a similar length if it is used for bulk materials or formations which comprise very fine particles as in an environment without such particles. This is shown by our own investigations with suspensions with such particles in comparison with particle-free systems in a test with a rheometer, in which the viscosity curve was measured as a function of time. The particle-containing suspension has an open time which is shorter by up to a factor of 3. The buffered particle-containing system on the other hand has an open time which is virtually the same as the particle-free system. In this way, complete infiltration of the bulk material or formation with the binder according to the invention is possible even in the case of such situations, without premature curing occurring, which makes complete infiltration impossible. Moreover, it was surprisingly found that the mechanical strength of the bound bulk materials or formations can be substantially improved by the use of a buffer solution.

Without wishing to be tied to theory, these improved properties are attributable mechanistically to the fact that the activity or catalyst effect of very fine particles present is inhibited by the pH adjustment and pH stabilization by the buffer, for example to a pH of about 4.75 for the acetic acid/acetate buffer. As an explanation, it is possible to put forward the argument that it is known that nanoparticles can be surface-modified with organic acids or complexing agents. This means that a chemical bond forms, which reduces the activity of the surface at this point. Suitable acids are organic acids and suitable complexing agents are, for example, β-diketones, the complex-forming effect of which on cations such as $Al^{3+}$, $Zr^{4+}$, $Ti^{4+}$ and others is known. Since both the complex formation of organic acids and that of β-diketones and others are pH-dependent, a stable effect is achievable only in a buffered system.

With the invention, it is now possible to use the binders according to the invention, which are preferably soluble binder systems capable of free radical polymerization, for infiltration and subsequent consolidation of loose bulk materials or formations without there being the danger of falling short of the desired consolidation of the bulk material or formation over the entire volume by an uncontrolled start of the reaction. The invention is described in detail below. Here, polymerization includes polymerization, polycondensation and polyaddition, unless specified.

The binders according to the invention comprise a hydrolysate or heterocondensate of silicon compounds and metal, phosphorus or boron compounds. The Si component used is at least one hydrolysable silicon compound. It is possible to use two or more hydrolysable silicon compounds and/or two or more metal, phosphorus or boron compounds together. If appropriate, the at least one hydrolysable silicon compound comprises one or more nonhydrolysable silicon compounds having at least one nonhydrolysable organic radical, the organic radicals of the Si compounds used preferably having no polymerizable groups.

The at least one hydrolysable silicon compound may be, for example, at least one hydrolysable silicon compound without nonhydrolysable groups. Examples of hydrolysable silicon compounds without nonhydrolysable groups which can be used are silicon compounds of the general formula

in which the radicals X are identical or different and represent groups which can be eliminated hydrolytically or hydroxyl groups.

Suitable examples of groups X which can be eliminated hydrolytically or hydrolysable groups X are hydrogen, halogen (F, Cl, Br or I, in particular Cl or Br), alkoxy (e.g. $C_{1-6}$-alkoxy, such as, for example, methoxy, ethoxy, n-propoxy, isopropoxy and n-butoxy, isobutoxy, sec-butoxy or tert-butoxy), isocyanato, aryloxy (preferably $C_{6-10}$-aryloxy, such as, for example, phenoxy), alkaryloxy, e.g. benzoyloxy, acyloxy (e.g. $C_{1-6}$-acyloxy, preferably $C_{1-4}$-acyloxy, such as, for example, acetoxy or propionyloxy) and alkylcarbonyl (e.g. $C_{2-7}$-alkylcarbonyl such as acetyl). Likewise suitable are $NH_2$, amino mono- or disubstituted by alkyl, aryl and/or aralkyl, examples of the alkyl, aryl and/or aralkyl radicals being those stated below for R, amido, such as benzamido, or aldoxime or ketoxime groups. Two or three groups X can also be linked to one another, for example in Si-polyol complexes with glycol, glycerol or pyrocatechol. Said groups can optionally contain substituents, such as halogen, hydroxyl or alkoxy.

Preferred hydrolysable radicals X are halogen, alkoxy groups and acyloxy groups. Particularly preferred hydrolysable radicals are alkoxy groups, preferably $C_{1-4}$-alkoxy groups, in particular methoxy and ethoxy.

Specific examples of hydrolysable silicon compounds of the formula $SiX_4$ are $Si(OCH_3)_4$, $Si(OC_2H_5)_4$, $Si(OC_3H_7)_4$, $SiCl_4$, $HSiCl_3$, $Si(OOCCH_3)_4$. Among these hydrolysable silanes, tetraethoxysilane (TEOS) is particularly preferred.

An additional compound, in particular a hydrolysable compound, of an element selected from the main groups I, II, III, IV and V and the subgroups IV and V is used as a further component for the heterocondensate. This is P, B or a metal of these groups, in particular Al, Ge, Sn, Pb, Ti, Mg, Li, V, Nb, Ta, Zr and Hf. By means of this component, the corrosion resistance and stability to hydrolysis of the cured binder are increased. Hydrolysable compounds of titanium, aluminium, zirconium, tin and boron are particularly preferred, titanium compounds being most preferred. The compounds can be used individually or as a mixture of two or more of these elements.

The metal, phosphorus or boron compound may be a compound of the formula (II)

in which M is P, B, Al, Ge, Sn, Pb, Ti, Mg, Li, V, Nb, Ta, Zr and Hf, X is identical or different and represents groups which can be eliminated hydrolytically or hydroxyl groups and a corresponds to the valency of the element, it being possible for a also to be greater or, in the case of polydentate ligands, also less than the valency of M in the case of the use of complex ligands, or can be corresponding soluble oxides or hydroxides. The valency of M is as a rule 1, 2, 3, 4 or 5. If appropriate, the compound of the formula (II) also comprises a counterion. Examples of X are defined as above for formula (I), including the preferred examples, it being possible for two groups X to be replaced by an oxo group. In addition to the substituents shown in formula (I), X may also be sulphate, nitrate, a complexing agent, such as, for example, a β-diketone, a saturated or unsaturated carboxylic acid or the salt thereof, an inorganic acid or a salt thereof and an amino alcohol. The metal, phosphorus or boron compound is in particular a hydrolysable compound. The phosphorus compound may be, for example, phosphorus oxides or phosphates. Metal or boron alkoxides are preferably used.

In a preferred embodiment, metal, phosphorus or boron compounds which comprise complex ligands, or a combination of metal, phosphorus or boron compounds and a complex ligand, are or is used. Without wishing to be tied to a theory, it is assumed that, with the use of a combination of metal, phosphorus or boron compounds and a complex ligand for the preparation of the hydrolysate and condensate, binding of the complex ligand to the central atom of the metal, phosphorus or boron compound used can result in situ. Suitable combinations can be readily chosen by the person skilled in the art. The combination can be obtained, for example, by simple mixing of the two components. The examples of complex ligands are acetyl acetonate, ethyl acetoacetate, dialkyl dithiophosphate, dodecylbenzenesulphonic acid, oleic acid and palmitic acid.

In an embodiment, the complex ligand may comprise a polymerizable radical. The polymerizable organic group may be any customary group which is known to the person skilled in the art and can undergo a polymerization with itself or with one or more other corresponding polymerizable groups. Here in the description, polymerization also includes very generally polycondensation and polyaddition apart from the preferred free radical polymerization.

Preferred metal compounds are the alkoxides of Ti, Zr and Al, in particular of Ti. Suitable metal, phosphorus or boron compounds, including those with complexing agents, are, for example, $Ti(OC_2H_5)_4$, $Ti(O-n-$ or $i-C_3H_7)_4$, $Ti(OC_4H_9)_4$, $TiCl_4$, $Ti(O-iC_3H_7)_2Cl_2$, hexafluorotitanic acid, $TiOSO_4$, diisopropoxybis(ethylacetoacetato)titanate, poly(dibutyl titanate), tetrakis(diethylamino)titanium, titanium 2-ethylhexoxide, titanium bis(triethanolamine)diisopropoxide, titanium chloride triisopropoxide, $Al(OC_2H_5)_3$, $Al(O-sec-C_4H_9)_3$, $AlCl(OH)_2$, $Al(NO_3)_3$, $Zr(OC_3H_7)_4$, zirconium 2-ethylhexoxide, $BCl_3$, $B(OCH_3)_3$ and $SnCl_4$, $Zr(OC_3H_7)_2(OOC(CH_3)\!\!=\!\!CH_2)_2$, titanium acetylacetonate, titanium oxide bis(pentanedionate), $Ti(OC_3H_7)_3(OOC(CH_3)\!\!=\!\!CH_2)$ and $Ti(OC_2H_4)_3(allylacetoacetate)$, phosphorus oxides or phosphates. Among the metal compounds, $Ti(O-iC_3H_7)_4$, $Ti(OC_4H_9)_4$, titanium bis(triethanolamine)diisopropoxide and $Ti(OC_3H_7)_3(OOC(CH_3)\!\!=\!\!CH_2)$ and Ti compounds comprising further complexing agents are particularly preferred. As stated, a combination of the metal, phosphorus or boron compound with the desired complexing agent can alternatively be used.

If appropriate, in addition to or instead of the abovementioned hydrolysable silicon compounds of the formula (I), one or more hydrolysable silicon compounds having at least one nonhydrolysable organic group can be used for the formation of the hydrolysate or heterocondensate. These are, for example, compounds or silanes of the general formula (III)

in which the radicals R are identical or different and represent groups which cannot be eliminated hydrolytically, the radicals X are identical or different and represent groups which can be eliminated hydrolytically or hydroxyl groups and n has the value 1, 2 or 3, preferably 1 or 2.

As examples of X, reference is made to the abovementioned examples of X in the formula (I), the preferred groups also being preferred here. The radicals R which cannot be eliminated hydrolytically are, for example, alkyl, e.g. $C_{1-20}$-alkyl, in particular $C_{1-4}$-alkyl, such as methyl, ethyl, n-propyl, isopropyl, n-butyl, isobutyl, sec-butyl and tert-butyl, aryl, in particular $C_{6-10}$-aryl, such as phenyl and naphthyl, and corresponding aralkyl and alkaryl groups, such as tolyl and benzyl, and cyclic $C_3$-$C_{12}$-alkyl groups, such as cyclopropyl, cyclopentyl and cyclohexyl. The radicals R may have customary substituents, e.g. halogen, such as chlorine or fluorine, and alkoxy. The radical R preferably has no polymerizable group. Preferred radicals R are alkyl groups having preferably 1 to 4 carbon atoms, in particular methyl and ethyl, and aryl radicals such as phenyl.

Examples of specific organosilanes of the general formula (III) are compounds of the following formulae: $CH_3SiCl_3$, $CH_3Si(OC_2H_3)$, $C_2H_5SiCl_3$, $C_2H_5Si(OC_2H_3)$, $C_3H_7Si(OC_2H_5)_3$, $C_6H_5Si(OC_2H_5)_3$, $(C_2H_5O)_3Si-C_3H_6-Cl$, $(CH_3SiCl_2, (CH_3)_2Si(OC_2H_5)_2, (CH_3)_2Si(OCH_3)_2, (CH_3)_2Si(OH)_2$, $(C_6H_5)_2SiCl_2$, $(C_6H_5)_2Si(OC_2H_5)_2$, $(i-C_3H_7)_3SiOH$, $n-C_6H_{13}CH_2CH_2Si(OC_2H_5)_3$, $n-C_8H_7CH_2CH_2Si(OC_2H_5)_3$, $CH_2OCH_2CH_2-O-(CH_2)_3-Si(OC_2H_5)_3$.

Particularly preferred silanes of the formula (III) are alkylsilanes, in particular alkyltrialkoxysilanes, methyltrimethoxysilane and in particular methyltriethoxysilane (MTEOS) being particularly preferred.

In an embodiment, at least one silicon compound having at least one nonhydrolysable group of the formula (III) can be used in combination with at least one hydrolysable silicon compound of the formula (I) as the Si compound. However, it is also possible to use only one or more hydrolysable silicon compounds having at least one nonhydrolysable group as the Si component, such as the silanes of the formula (III), which preferably comprise no polymerizable group.

In a further embodiment, a compound whose nonhydrolysable organic radical carries a polymerizable group can be used as a hydrolysable silicon compound having at least one nonhydrolysable organic radical for the preparation of the hydrolysate or heterocondensate. Said compound may be silanes of the formula (III) in which at least one radical R comprises a polymerizable group and a divalent bridging group for binding to the Si.

Examples of the polymerizable group are epoxide, hydroxyl, amino, monoalkylamino, dialkylamino, optionally substituted anilino, amido, carboxyl, alkenyl, alkynyl, acryloyl, acryloyloxy, methacryloyl, methacryloyloxy, mercapto, cyano, isocyanato, aldehyde, keto, alkylcarbonyl, acid anhydride and phosphoric acid. The polymerizable group is bonded to the silicon atom via two bridging groups, in particular alkylene or arylene bridging groups, which may be interrupted by oxygen or —NH groups. The bridging groups contain, for example, 1 to 6 carbon atoms. Said divalent bridging groups are derived, for example, from the abovementioned monovalent alkyl or aryl radicals. The bridging group is preferably an alkylene group, in particular a propylene group.

Specific examples are vinylsilanes, acryloylsilanes and methacryloylsilanes, such as vinyltriethoxysilane, (meth)acryloyloxyalkyltrimethoxysilane and (meth)acryloyloxyalkyltriethoxysilane, e.g., methacryloyloxypropyltrimethoxysilane.

Silanes and polysiloxanes described below can be prepared by known methods; cf. W. Noll, "Chemie and Technologie der Silicone [Chemistry and Technology of the Silicones]", Verlag Chemie GmbH, Weinheim/Bergstraße (1968).

The molar ratio of Si atoms of all Si compounds used to the metal, phosphorus and boron atoms of all abovementioned metal, phosphorus and boron compounds used can be chosen within wide ranges but is preferably 10:1 to 1:3 and more preferably 5:1 to 1:1.

In addition to said metal, phosphorus or boron compounds, additional metal compounds can be used. Examples of such metal compounds are compounds of other glass- or ceramic-forming metals, in particular compounds of at least one metal from main group III and V and/or of subgroups II to VIII of the Periodic Table of the Elements. These are, for example, hydrolysable compounds of Mn, Cr, Fe, Ni, Ga, In, Sc, Y and Zn. For example, hydrolysable compounds of elements of the main groups I and II of the Periodic Table of the Elements, e.g. Na, K and Ca, can also be used. Hydrolysable compounds of the lanthanides, such as Ce, can also be used. These are, for example, metal compounds of the general formula $M'X_a$, in which M' is a metal of main groups I, II, III or V or of subgroups II to VIII of the Periodic Table of the Elements or is a lanthanide, and X and a are as defined in formula (II).

The binder furthermore comprises a purely organic polymer component so that an additional organic matrix can be synthesized. The organic component comprising the monomers or oligomers defined below is preferably soluble. By additional use of such an organic component, even further improved mechanical strength and flexibility can be achieved. This results, after curing, in two interpenetrating polymers, namely a heterocondensate and a purely organic polymer, so that IPN polymers (IPN=Interpenetrating Networks, cf. for example Römpp Chemie Lexikon [Römpp Chemistry Lexikon], 9$^{th}$ edition, page 2007) are formed, which were described generally above. The interpenetrating polymers may be purely physically mixed. Without wishing to be tied to a theory, a certain binding of heterocondensate and purely organic component via the use of complexing agents having a polymerizable group, which was explained above, can be achieved. In addition to the binding via complexing, binding via ionic interactions, dipolar interactions, hydrogen bridge bonds or van-der-Waals interactions is also conceivable. If, for example, vinylpyridine is used as a monomer for the organic component, the pyridine nitrogen can also or additionally permit binding via ionic binding to Si—OH groups of the inorganic component via acid/base reactions.

For the organic binder component, one or more organic polymerizable or polycondensable monomers or oligomers are used. These can have one or more polymerizable or polycondensable groups, groups capable of free radical polymerization being preferred. Thermally polymerizable or polycondensable groups are preferred. It is also possible to use a mixture of two or more monomers or oligomers. The respective advantages of the alternatives are described further below. Examples of polymerizable groups are epoxide, hydroxyl, amino, monoalkylamino, dialkylamino, optionally substituted anilino, amido, carboxyl, alkenyl, alkynyl, acryloyl, acryloyloxy, methacryloyl, methacryloyloxy, mercapto, cyano, isocyanato and acid anhydride; C=C double bonds are preferred, in particular acryloyl and methacryloyl groups, hydroxyl, amino-, carboxyl and acid anhydride groups, epoxide and/or isocyanato groups. Further examples are acid chloride groups, nitrile, isonitrile and SH groups.

The organic monomer or oligomer preferably comprises at least two polymerizable or polycondensable groups. The polymerizable groups serve in general for the polymerization or linkage of the organic component, it being possible for it to be a polymerizable or polycondensable group or to be corresponding polymerizable or polycondensable groups.

Organic monomers or oligomers as the binder component are very familiar to the person skilled in the art and he can readily choose them in a suitable manner depending on requirements. The organic component used may comprise defined individual compounds or mixtures of compounds having different degrees of polymerization.

It is possible to use monomers or oligomers which give, for example, polyisocyanates, melamine resins, polyesters or epoxy resins on polymerization. Mono-, bi- or polyfunctional acrylates and methacrylates are preferably used as monomers or oligomers. Examples of the organic monomer or oligomer are diethylene glycol dimethacrylate (DEGDMA), triethylene glycol dimethacrylate (TEGDMA), bisphenol A glycidyl methacrylate (BisGMA), bisphenol A diacrylate, butyl acrylate (BA), diurethane dimethacrylate, urethane dimethacrylate (UDMA), styrene, styrene derivatives, vinylpyridine, vinylbenzenesulfonic acid, Laromer® acrylates from BASF, Ebecryl®, pentaerythrityl triacrylate (PETIA), hexanediol diacrylate, trimethylolpropane triacrylate, trimethylolpropane trimethacrylate, neopentylglycol dimethacrylate, neopentylglycol diacrylate, epoxy acrylat resins, oligomeric methacrylates, such as LR 8862, LR 8907 from BASF, or oligomeric urethane acrylates, such as UA 19T from BASF, and oligomers of said monomers.

As an additional component, the binder may comprise polysiloxanes, such as, for example, poly(alkoxysilanes) or polyalkylsiloxanes or corresponding polyarylsiloxanes and copolymers thereof. It is possible to use polysiloxanes which carry no reactive groups. However, it is preferable to use polysiloxanes which have at least one reactive group, in particular a reactive terminal group. IPN polymers having covalent bonds between the interpenetrating polymers can be obtained thereby. However, it is also possible to form IPN polymers which are purely physically mixed.

There is a large variety of poly(alkoxysilanes), polyalkylsiloxanes and polyarylsilanes and copolymers thereof having reactive terminal groups. In particular, such polysiloxanes, in particular polyalkylsiloxanes, having reactive groups or terminal groups are commercially available, for example from Gelest, Inc., Philadelphia. Examples of the reactive group or terminal group are vinyl, hydride, silanol, alkoxy, amines, epoxy, carbinol, methacrylate/acrylate, mercapto, acetoxy, chloride and dimethylamine. Via the reactive groups or terminal groups, the polysiloxanes can be incorporated into the inorganic network and, if appropriate, into the organic matrix or can be crosslinked. If, for example, polysiloxanes having terminal silanol groups are used, the silanol group will react with hydroxyl groups of the hydrolysed silanes or with the metal or boron compounds. The resilience or compressive strength of the moulded article is surprisingly further increased as a result.

The polysiloxanes may be branched or preferably linear. The reactive group can be present on the main chain or a side chain but is preferably a terminal group. It is also possible for more than one reactive group to be present, for example 2 or more reactive groups. A linear polysiloxane contains, for example, preferably 2 reactive terminal groups. Polysiloxanes having silanol and alkoxy groups, in particular polysiloxanes having terminal silanol groups, are preferably used as polysiloxanes having reactive groups or terminal groups.

Examples of poly(alkoxysilanes), polyalkyl- or polyarylsiloxanes and copolymers thereof are polydimethylsiloxanes, polydiethylsiloxanes, polymethylethylsiloxanes, polydiphenylsiloxanes and corresponding copolymers which in each case contain at least one reactive group. Specific examples are polydimethylsiloxanes having terminal silanol groups or having terminal alkoxy groups, poly(diethoxysiloxanes) and polydimethoxysiloxanes.

The molecular weight of the polysiloxanes used can be selected from a large range depending on the field of use, for example in the range from 100 to 10 000 g/mol. Preferred polysiloxanes are those having a molecular weight of 100 to 3500 g/mol and more preferably 300 to 3000 g/mol, e.g. 400 to 2000 g/mol. It is also possible to use higher molecular weight polysiloxanes, for example having a molecular weight up to 50 000 g/mol or more. The molecular weight is understood here as meaning the number average molecular weight.

The weight ratio of all inorganic components used, including the organic groups present therein, to the purely organic components used can be chosen within wide ranges and is, for example, 95:5 to 5:95 and preferably 80:20 to 20:80, based on the cured binder.

By the addition of the organic component, IPN (interpenetrating network) polymers comprising interpenetrating polymers, namely the heterocondensate and the purely organic polymer, can be synthesized.

For the preparation of the hydrolysate or heterocondensate, the at least one silicon compound and the at least one metal, phosphorus or boron compound are subjected to hydrolysis by mixing with water, the reaction preferably being carried out by the CCC process discussed below, in order to obtain a homogeneous heterocondensate of Si components and metal, phosphorus or boron components. The hydrolysis is effected in particular by the sol-gel process. In the sol-gel process, in general the hydrolysable compounds are hydrolysed with water, if appropriate in the presence of acidic or basic catalysts. Preferably, the hydrolysis is effected in the presence of acidic catalysts, e.g. hydrochloric acid or phosphoric acid, preferably at a pH of 1 to 3. The resulting sol can be adjusted by suitable parameters, for example degree of condensation, solvent or pH, to the viscosity desired for the binder. Sol-gel processes have long been known. Details of the sol-gel process are described, for example, in C. J. Brinker, G. W. Scherer: "Sol-Gel Science—The Physics and Chemistry of Sol-Gel Processing", Academic Press, Boston, San Diego, New York, Sydney (1990).

For the hydrolysis, it is possible to use stoichiometric amounts of water, but also smaller or larger amounts, for example up to 1.2 mol of water per mole of the hydrolysable groups present. A substoichiometric amount of water, based on the hydrolysable groups present, is preferably used. The amount of water used for hydrolysing and condensing the hydrolysable compounds is preferably 0.1 to 0.9 mol and particularly preferably 0.25 to 0.75 mol of water per mole of the hydrolysable groups present. Often, particularly good results are obtained with less than 0.7 mol of water, in particular 0.45 to 0.65 mol of water, per mole of hyrolyzable groups present. Here, hydrolysable groups present are understood as meaning all hydrolysable groups of the starting compounds added in total, i.e. including the metal, phosphorus or boron compounds optionally added only later.

Hydrolysable silicon compounds and metal, phosphorus or boron compounds have different reactivities with respect to hydrolysis and condensation. Furthermore, the hydrolysis products are more or less unstable so that condensation reactions follow after hydrolysis is complete. If, for example, hydrolysable silicon compounds and titanium compounds are simultaneously hydrolysed, separate $TiO_2$ particles are virtually unavoidably formed, so that a major part of the Ti is not incorporated into the resulting condensate. This has the result that a homogeneous cocondensate cannot form.

In a preferred embodiment, the hydrolysis is therefore effected in two or more stages by the so-called chemically controlled condensation process (CCC process). This takes into account the fact that the hydrolysable compounds used have different hydrolysis reactivities. Thus, tetraalkoxysilanes, such as TEOS, generally have a lower reactivity than alkyltrialkoxysilanes, such as MTEOS, which in turn have a lower hydrolysis reactivity than dialkyldialkoxysilanes. As mentioned above, in particular the metal, phosphorus or boron compounds have as a rule a higher hydrolysis reactivity than hydrolysable silanes. These different reactivities are known to the person skilled in the art.

According to the preferred two-stage or multistage hydrolysis process, first one or more hydrolysable compounds having a lower hydrolysis reactivity are mixed with in general the amount of water which is intended for the formation of the hydrolysate or condensate, in order to prehydrolyse these compounds, and then one or more hydrolysable compounds having a higher hydrolysis reactivity are added to these mixtures. This can, if required, be even further differentiated by carrying out three or more stages, one or more compounds having the lowest hydrolysis reactivity being prehydrolysed in the first stage, one or more compounds having the highest hydrolysis reactivity being added in the final stage and compounds having medium hydrolysis reactivity being added in the middle stage or stages.

In the preparation of the hydrolysate or heterocondensate in two or more stages, the hydrolysis of the silanes when mixing of hydrolysable silanes and water, if appropriate in the presence of a catalyst, is first effected. As a result of the hydrolysis, the added free water is consumed. The hydrolysed silanes can then undergo condensation reactions in which water is liberated again. Even if condensation reactions can, where appropriate, begin before the silanes have been completely hydrolysed, the content or the concentration of free water in the mixture decreases to a minimum with time after addition of the water and then increases again owing to condensation reactions. Since, based on the hydrolysable groups of the hydrolysable silanes, preferably not more than a stoichiometric amount and more preferably a substoichiometric amount of water is added, the water used is first completely or substantially completely consumed before water is liberated again by the condensation, i.e. at the minimum virtually no water or only little water is present in the mixture.

According to the invention, the metal, phosphorus or boron compound is thus added to the mixture of the hydrolysable silicon compound and water when the water in the reaction mixture has been substantially consumed by the hydrolysis, i.e. no water or only a small amount of water, preferably less than 15%, more preferably less than 10% and particularly preferably less than 5% of the amount of water which was added for the hydrolysis, is present in the reaction mixture at the time of addition of the metal, phosphorus or boron compound. The metal, phosphorus or boron compound is also added in particular before a higher content of free water forms in the reaction mixture as a result of the condensation reaction.

Since the reactions taking place are equilibrium reactions, and in some cases condensation reactions can also take place during the hydrolysis itself, small amounts of water may still be present when the added water in the reaction mixture is consumed. What is important is that the addition of the metal, phosphorus or boron compound is effected when the content of water in the reaction mixture is minimal or is in the region of the minimum.

The methods for determining the water content in a mixture are familiar to the person skilled in the art. Examples of such methods are the Karl-Fischer titration or IR spectroscopy. The suitable time span for the addition of the metal or boron compound can also be determined in a simple manner empirically, for example in the course of preliminary experiments in which the metal, phosphorus or boron compound is added at certain times to the mixture of hydrolysable silicon compound/water and a test is then carried out, for example by photocorrelation spectroscopy (PCS), to determine whether particles which are the oxides of the metal or boron compound, for example $TiO_2$ particles, form. If such particles form, the addition has been effected too early or too late. The suitable time span for the addition in which these particles are not formed can easily be determined in this way.

Another method for determining the time of addition, which can easily be carried out, is the determination of the clearpoint. Before the beginning of the hydrolysis, the silane phase is not miscible with water. On addition of water, this is indicated by turbidity of the stirred reaction mixture. Only through the formation of alcohol and ≡SiOH with simultaneous consumption of water does the system become a single phase and indicates the substantial consumption of $H_2O$. At the clearpoint, these two phases coalesce and the reaction mixture becomes clear. Even if the reaction mixture remains turbid, for example owing to polysiloxanes present, this "clearpoint" is still detectable. Since the clearpoint occurs as a rule approximately when the added water has been substantially consumed or the water content is minimal, the metal, phosphorus or boron compound can be added when the clearpoint has been reached. This of course includes addition shortly before or after the clearpoint.

The hydrolysate or condensate obtained can be used as it is. The resulting sol can be adjusted by suitable parameters, e.g. degree of condensation, solvent or pH, to the viscosity desired for the binder. In a preferred embodiment, the binder is allowed to mature or age by simply allowing to stand, for example for at least 1 h and preferably at least 5 h. Thereafter, it can be used for the intended application for the binder.

Results have surprisingly found that an even more homogeneous heterocondensate can be obtained, (for example in the absence of polysiloxanes) if the starting materials are used undiluted, i.e. without solvent. The hydrolysis and condensation are therefore preferably carried out without addition of solvents. It should be taken into account that solvent may form in situ during the hydrolysis reactions of the starting materials, such as the alcoholates. The reaction mixture is as a rule therefore not free of solvent as the hydrolysis progresses but is substantially less dilute than is otherwise usual according to the prior art. After completion of the reaction, for example after the above maturing, solvent can be added, for example for adjusting the viscosity.

In a two-stage or multistage process, the intended amount of water can be added completely in the first step. In an embodiment, a part of the intended amount can be added only after the addition of the metal, phosphorus or boron compound. In this case, instead of 100% of the intended amount of water as described above in the first step for the hydrolysis, for example, 90 to 20% and preferably 70 to 30% of the intended amount of water as described above are used.

The remainder of the intended amount is then added, for example, directly after the addition of the hydrolysable metal, phosphorus or boron compound or preferably after maturing. In another embodiment, 100% of the intended amount of water as described above can be used in the first step for the hydrolysis and an additional amount of water can be added after the addition of the metal, phosphorus or boron compound. Expedient amounts for the addition of water then correspond to the abovementioned amounts for the first step. It is also possible to add more water, especially after maturing is complete.

The organic component (monomers and/or oligomers) is preferably added after the preparation of the heterocondensate but can also be added beforehand. In this case, the binder component is added to a precursor of the heterocondensate, i.e. for example to the hydrolysable or the hydrolysed silicon compounds or to the metal, phosphorus or boron compound. The optional polysiloxane component is preferably initially introduced together with the other Si components before the water is added. If appropriate, it can also be added at a later time. The binder can be diluted by addition of solvent.

For achieving a material having a sufficiently low viscosity, it may be advantageous if the organic binder component is used in the form of monomers or short-chain oligomers which in each case have at least one polymerizable group. These are then polymerized during the curing with formation of polymers. Inorganic fractions which have not yet undergone complete hydrolysis or polycondensation can be further reacted, for example during the curing, by diffusion of moisture so that a stable inorganic network forms.

Another variant is the use of unreactive oligomers or polymers as an additional organic component. The advantage of such systems is that shrinking during polymerization no longer occurs for the unreactive oligomers or polymers. In conjunction with hydrolysable silanes which carry a high proportion of nonpolymerizable organic groups, it is thus possible to prepare binders which show scarcely any shrinkage during the gel formation or solidification (curing) and are therefore suitable in particular for sealing.

By the use of inorganic and organic components which carry both hydrophilic and hydrophobic groups (inert hydrocarbon groups=hydrophobic; SiOH groups=hydrophilic), so-called amphiphilic binders form, which have good adhesion both to hydrophilic and to hydrophobic surfaces. The advantage of this property is that, for example, bulk or loose substrates, such as bulk materials, can be bound or filled independently of whether they have a hydrophilic or a hydrophobic surface.

The binder comprises a buffer solution, also referred to as buffer, as a further substantial component. By means of the buffer, firstly the pH of the binder is adjusted to a desired value and secondly the binder is stabilized or "buffered", i.e. the pH of the binder scarcely changes in the case of dilutions of the binder or or in the case of additions of acid or base to the binder in amounts which are not too large. As a result of the addition of the buffer solution, the pH of the binder is adjusted to a value in the range from 2 to 7, preferably 4 to 6, more preferably 4.5 to 6 or 4 to 5.

Buffers are in general solutions of a weak acid and the conjugated base or a dissociated neutral salt of the acid or a weak base and the conjugated acid or a dissociated neutral salt of the base. According to the invention, buffers based on a weak acid and the conjugated base are preferred. They may also be polymeric buffers or mixtures of different acids and/or bases. Such buffers and the usable buffer range thereof are known to the person skilled in the art. All customary buffer systems suitable for this pH range can be used for the binder according to the invention and the person skilled in the art can easily select them.

Acetic acid/acetate buffers can be obtained, for example, by mixing a strong base, e.g. KOH, NaOH or NaOEt, and acetic acid in a solvent, such as alcohol, preferably ethanol. A suitable buffer can be obtained, for example, by dissolving the base in ethanol and then adding acetic acid.

The buffer can be formed with an organic solvent, preferably alcohol, such as methanol or ethanol. Alcoholic buffers are preferably used, particularly preferably ethanolic buffers. Thus, buffer substances which are soluble in alcohol, particularly preferably ethanol, are particularly preferably used. In the case of buffers based on organic acids, the salt of the organic acid may account, for example, for 1 to 20% by weight of the buffer. Buffers can in general exert their buffer effect within a certain pH range.

Such buffers are commercially available and can be readily prepared by the person skilled in the art. Buffers based on weak acids can be prepared, for example, by addition of a certain amount of base to a solution of a weak acid, addition of acid to a salt of a weak acid or mixing of a weak acid with a salt of the conjugated base. Buffers based on weak bases can be prepared analogously. The technical literature contains corresponding buffer tables stating amounts for the components to be used and the pH obtainable therewith.

Main criteria for the buffers used are the pH range in which the buffer is effective and its solubility in the solvent used, which is preferably an alcohol, such as methanol or ethanol. The effective buffering range of the buffer should be at least partly in the pH range from 2 to 7, preferably 4 to 5. The buffer is preferably a buffer comprising acids, e.g. inorganic or preferably organic acids.

Examples of suitable buffers are (effective buffering range is stated in brackets): acetic acid/acetate buffer (pH=3.7-5.7), citric acid/trisodium citrate buffer (pH=2.2-8), tartaric acid/tartrate buffer, 2-(4-(2-hydroxyethyl)-1-piperazinyl)ethanesulphonic acid (pH=6.8-8.2) and 2-(N-morpholino)ethanesulphonic acid (pH=5-7). Buffers comprising organic acids are particularly preferred. An acetic acid/acetate buffer with which the pH can preferably be adjusted to about 4.75 is particularly preferred. Buffers based on carboxylic acid are preferred since, in addition to the buffer effect, they can also prolong the open time or gelling time.

The buffer system preferably comprises a complexing agent. As a result of the complexing agent, "peaks", e.g. of oxide components which contain the metal components, such as, for example, Al, Ti or Zr, can be "deactivated".

The complexing agent may be, for example, an organic acid or a chelating agent. The complexing agent is preferably suitable for complexing ions or metal ions having a relatively high valency, such as, for example, Al, Ti or Zr ions. These are known to the person skilled in the art. Examples of complexing agents or chelating agents are α- and β-hydroxycarbonyl compounds, such as hydroxycarboxylic acids, -ketones or -aldehydes and their analogues, such as β-diketones, such as acetylacetone and ethyl acetoacetate, polyoxycarboxylic acids, polyamines, such as ethylenediamine, aminoalcohols, such as triethanolamine, dialkyl dithiophosphate, dodecylbenzenesulphonic acid, EDTA and nitrilotriacetic acid, β-diketones being particularly preferred. Examples of organic acids are acetic acid, citric acid, tartaric acid, oleic acid and palmitic acid. The complexing agent is preferably chosen so that, at the set pH, it has a complex-forming effect on the metal cations present in the binder, such as, for example, $Al^{3+}$, $Zr^{4+}$ or $Ti^{4+}$, or the oxides derived therefrom.

If the preferred buffer is used with an organic acid, the organic acid simultaneously acts as a complexing agent. In this case, no additional complexing agent is required for a complexing effect. If the buffer itself comprises no complexing agent, for example in the case of a buffer comprising an inorganic acid, an additional complexing agent, particularly preferably a chelating agent, is preferably added to the buffer in order to achieve the complexing effect. The optionally used additional complexing agent is preferably added to the buffer and then added with the buffer to the binder; separate addition of the complexing agent to the binder is optionally also possible.

The buffer can be added to the binder at any desired time; in general, it is added after the preparation of the hydrolysate or condensate or after the maturing thereof. It can be added before, together with and after the addition of the organic component.

If the binder has a strongly acidic or basic pH as a result of the preparation of the hydrolysate or heterocondensate, the buffer may comprise a corresponding, optionally additional amount of acid or base intended for this purpose, in order to bring the pH to the desired value, i.e. the acid or base which is present in the binder and originates, for example, from the preparation of the heterocondensate is "neutralized". Suitable bases for changing the pH of an acidic binder to the desired value are, for example, strong bases, such as alkali metal hydroxides, e.g. KOH or NaOH, or alkali metal alkoxides, such as KOEt, KOMe or NaOEt. The required amount of additional base or acid for changing to the desired pH can be easily calculated by the person skilled in the art.

It may, if appropriate, be the same acid or base which is also used for the preparation of the actual buffer. In this case, a larger amount of acid or base is used for the preparation of the buffer than would be required for the preparation of the actual buffer. The amount of base or acid which is required for changing the pH of the binder to the desired value can of course also be added as a separate component to the binder independently of the actual buffer, but the inclusion in the buffer is as a rule more expedient.

Ionic or free radical initiators for the polymerization are preferably also added to the binder, preferably thermal initiators, free radical initiators being preferred. The initiator initiates the polymerization, with the result that the binder is cured or crosslinked. These catalysts are known to the person skilled in the art and he can easily choose the suitable ones taking into account the components used. Examples of free radical thermal initiators are organic peroxides, e.g. diacyl peroxides, peroxydicarbonates, alkyl peresters, alkyl peroxides, perketals, ketone peroxides and alkyl hydroperoxides, and azo compounds. Specific examples are dibenzoyl peroxide, Trigonox® 121, tert-butyl perbenzoate, amyl peroxy-2-ethylhexanoate and azobisisobutyronitrile. These initiators are used in the customary amounts known to the person skilled in the art, e.g. 0.01 to 5% by weight, based on the total solids content of the binder. Peroxides are particularly preferably used as polymerization initiators.

Examples of solvents which can be used for the binder are alcohols, preferably lower aliphatic alcohols ($C_1$-$C_8$-alcohols), such as methanol, ethanol, 1-propanol, isopropanol and 1-butanol, ketones, preferably lower dialkyl ketones, such as acetone and methyl isobutyl ketone, ethers, preferably lower dialkyl ethers, such as diethyl ether, or monoethers of diols, such as ethylene glycol or propylene glycol, with $C_1$-$C_4$-alcohols, amides, such as dimethylformamide, tetrahydrofuran, dioxane, sulphoxides, sulphones or butylglycol and mixtures thereof. Alcohols are preferably used. It is also possible to use high-boiling solvents; e.g. polyethers, such as triethylene glycol, diethylene glycol diethyl ether and tetraethylene glycol dimethyl ether.

Other conventional additives which can optionally be added to the binder are, for example, dyes, pigments, viscosity regulators and surfactants. For the preparation of emulsions of the binder, for example, the stabilizing emulsifiers customary in the case of silicone emulsions, such as, for example, Tween® 80 and Brij® 30, can be used.

The binder according to the invention which is obtained is preferably present free of particles as a solution or emulsion; it is preferably free of crystalline products or particles, and this can be demonstrated, for example, by photocorrelation spectroscopy (PCS). It is preferably a binder sol.

According to the invention, a binder which comprises a heterocondensate which is a metallo-, phosphoro- or borosiloxane and contains heteroatom units of heteroatoms selected from P, B, Al, Ge, Sn, Pb, Ti, Mg, Li, V, Nb, Ta, Zr and Hf, which are incorporated into the siloxane skeleton via oxygen bridges, and siloxane units in which the silicon atom optionally has a nonhydrolysable organic group, is accordingly preferably provided. By means of the preferably used CCC process, a homogeneous distribution of the Si atoms and of the metal, boron or phosphorus atoms in the skeleton is achieved, with the result that good stability to hydrolysis is achieved. The heteroatom is incorporated into the siloxane skeleton via 2, 3 or 4 oxygen bridges, depending on valency. Preferably used heteroatoms are B, Al, Sn, Ti or Zr, so that boro-, alumino-, stanno-, titano- or zirconosiloxanes are formed, titanosiloxanes being particularly preferred. At least some of the Si atoms or all Si atoms of the siloxane skeleton preferably have a nonhydrolysable organic nonpolymerizable group.

A further important advantage of the binders obtained is that they are present as a sol or solution even after a relatively long time and do not form a gel. The binder according to the invention is pH-buffered by the buffer solution. As shown in the examples, the gelling time of the binder on initiation of the polymerization is thus substantially increased compared with unbuffered binders, in particular if very fine particles are present in the system. An improvement in the mechanical properties of the bound bodies was also found.

Oil-, hot water- and temperature-resistant binders are obtained. They are suitable for the production of moulded articles and for consolidating bulk or loose substrates, in particular finely divided, pulverulent or granular substrates, in particular inorganic granules, the binder being mixed with the substrate, for example in the form of particles, granules or fibres, optionally brought into the desired form and then cured. The substrate to be set can be selected, for example, from metals, nonmetals, glass, ceramic, carbon, oxides, nitrides, carbides, borides, minerals, plastics, plastics fibres, glass fibres, mineral fibres, natural fibres, sand, soil, gravel, concretes, cements, straw and wood-based materials. The substrate may be, for example, a geological formation, grit or a bulk material, soil or rock.

The binder according to the invention is used for consolidating the substrate, for example the inorganic granules, such as, for example, sand. For this purpose, for example, a bulk material of the substrate is mixed with the binder and then cured. The mixing can be effected in a customary manner, for example by mixing or infiltrating the binder into the substrate to be consolidated, for example by pumping in.

The curing of the binder or of the moulded article is preferably carried out thermally by supply of heat. Examples of catalysts or initiators suitable for this purpose are mentioned above. Another method of curing is the supply of condensation catalysts which effect further crosslinking of the inorganically crosslinkable SiOH groups or metal-OH groups with formation of an inorganic network. Condensation catalysts suitable for this purpose are, for example, bases but also fluoride ions.

The properties of substrates bound with a binder also depend on the conditions under which they are cured. The curing is also referred to as setting. As a rule, improved behaviour is obtained if the setting process is effected approximately under the conditions under which the bound substrates are to be used or are present. For applications at elevated pressures and temperatures, it is therefore desirable also to carry out the preparation under approximately the same conditions.

Thus, for example, hydrothermal conditions are present at relatively great water depths, i.e. an elevated temperature and elevated pressure, so that, for applications at such water depths, it is expedient also to carry out the setting under the corresponding hydrothermal conditions, for example at temperatures above 40° C. and above 1 bar, for example at least 2 bar, or directly at the place of use. A particular advantage of the binder according to the invention is that it can also be cured or set under such hydrothermal conditions so that it is particularly suitable for applications under these conditions, for example under water.

For such applications, the setting (curing) is preferably effected under elevated temperature and elevated pressure, based on the standard conditions of temperature and pressure, i.e. the pressure is greater than 1 bar and the temperature is higher than 20° C. Preferably, the binder is cured as a rule at temperatures above 40° C. and pressures above 1 bar, for example more than 2 bar or even more than 40 bar, according to the geological boundary conditions of the reservoir in which it is used. By using the organic component, improved mechanical strength and good flexibility are also achieved through the formation of the IPN polymer after setting.

The binder according to the invention can be solidified, depending on the chemical properties of the organic and inorganic constituents, via inorganic condensation reactions and via polymerization reactions of the organic polymerizable or polycondensable monomers or oligomers used (parallel to the condensation, before the condensation or after the condensation). Depending on the established shrinkage behaviour, sealing or only consolidation of a bulk material or of grit can be effected.

The behaviour of the binder according to the invention can be controlled so that voids or channels as occur, for example, in formations, grit and bulk materials are completely filled or remain completely or partly open. The consolidation of the bound substrate can thus lead to sealing in the case of filling of the voids or channels, or to at least partial retention of the permeability of the unbound substrate when filling is absent.

If the binder consists, for example, mainly of the inorganic component, the permeability of the substrate can be maintained owing to the syneresis effect described above, since the substrate remains porous. On the other hand, the organic component tends to result in filling of the pores or channels and hence in sealing. Depending on the ratio of inorganic component to organic component used in the binder, consolidation and sealing or consolidation and at least partial retention of the permeability can thus be achieved. Since polymerization of the organic binder component leads to polymerization shrinkage, an organic binder component may additionally contain unreactive oligomers or polymers if, for example, complete sealing of the substrate is desired.

Since, particularly under hydrothermal conditions, setting of materials with the binder according to the invention can partly or completely prevent a densification process, the binder can fill a large pore volume. This can be prevented, or eliminated, for example, preferably by displacing the liquid binder from the pores, for example by blowing a liquid or gaseous medium, such as air or nitrogen, into the material to be set, which is mixed with the binder, so that binder remains only at the contact points of the particles, with the result that a porosity can be established in the desired manner. The blowing in is effected in particular before or during the setting over a certain period.

Parameters for pumping through, such as duration, time, amount or flow rate of the liquid or gaseous phase, can be readily chosen by the person skilled in the art in a suitable manner in order to establish the desired porosity. The introduction can be effected, for example, before or after partial curing, complete curing being effected after and/or during the introduction. For the introduction of a liquid or gaseous medium, for example, an inert solvent or gas, e.g. $N_2$, $CO_2$ or air, can be pumped in, with the result that the pore volumes are flushed out and reaction products are removed. The liquid or gaseous medium can optionally contain catalysts and/or gas-liberating components or dissolved substances.

Owing to its chemical constitution, the binder according to the invention permits, as explained above, rapid and effective consolidation of oil- or water-carrying, generally sand-containing geological formations. Furthermore, it was found that the binder is also particularly suitable for contaminated sands, in particular oil-contaminated sands, since the binder can migrate under and detach dirt, in particular an oil layer on the inorganic surface. The latter has the additional effect that such systems are also suitable for detaching greases and oils from inorganic surfaces and, for example, for improving the discharge of such substances from the interstices of sand bulk materials or geological formations. It is therefore possible to realize binding processes in oil-containing sands and to remove oil from such sands. A treatment of contaminated sand with the binder can thus have a consolidating or a cleaning function or can fulfil both purposes.

For this purpose, the heterocondensate may additionally contain a component which is oleophobic and hydrophobic, with the result that the wetting behaviour of geological formations can be changed. Preferably, one or more silanes of the general formula (IV)

$$Rf(R)_b SiX_{(3-b)} \quad (IV)$$

in which X is defined as in formula (I) and R as in formula (III), Rf is a nonhydrolysable group which has 1 to 30 fluorine atoms bonded to aliphatic carbon atoms and b is 0, 1 or 2, can be used for the oleophobic and hydrophobic component of the heterocondensate as an additional Si component for the preparation of the heterocondensate. These compounds are also referred to below as fluorosilanes. The silane can be used as an additional Si component in the process according to the invention exactly as described above for the other Si components.

In the formula (IV), Rf is preferably a fluorinated alkyl group, for example having 3 to 20 C atoms, and examples are $CF_3CH_2CH_2$, $C_2F_5CH_2CH_2$, $n\text{-}C_6F_{13}CH_2CH_2$, $i\text{-}C_3F_7OCH_2CH_2CH_2$, $n\text{-}C_8F_{17}CH_2CH_2$ and $n\text{-}C_{10}F_{21}\text{---}CH_2CH_2$. Preferred examples of Rf are 1H,1H,2H,2H-perfluorooctyl. Examples of fluorosilanes which can be used are $CF_3CH_2CH_2SiCl_2(CH_3)$, $CF_3CH_2CH_2SiCl(CH_3)_2$, $CF_3CH_2CH_2Si(CH_3)(OCH_3)_2$, $C_2F_5\text{---}CH_2CH_2\text{---}SiZ_3$, $n\text{-}C_6F_{13}\text{---}CH_2CH_2SiZ_3$, $n\text{-}C_8F_{17}\text{---}CH_2CH_2\text{---}SiZ_3$, $n\text{-}C_{10}F_{21}\text{---}CH_2CH_2\text{---}SiZ_3$, in which $Z=OCH_3$, $OC_2H_5$ or Cl; $i\text{-}C_3F_7O\text{---}CH_2CH_2CH_2\text{---}SiCl_2(CH_3)$, $n\text{-}C_6F_{13}\text{---}CH_2CH_2\text{---}Si(OCH_2CH_3)_2$, $n\text{-}C_6F_{13}\text{---}CH_2CH_2\text{---}SiCl_2(CH_3)$ and $n\text{-}C_6F_{13}\text{---}CH_2CH_2\text{---}SiCl(CH_3)_2$.

The binder can bring about a change in the wetting behaviour of sands so that it tends to serve as an agent which regulates the wetting. For this purpose, it may be expedient to use the binder in high dilution, for example having a solids content of not more than 10% by weight.

The binder according to the invention can be used for the formation or consolidation of moulded articles or formations. In particular, the binder can be used for consolidating geological formations or granular bulk materials, in particular in the area of oil and gas extraction. The binder is also suitable for consolidating foundry sands. Further fields of use for the binder are the consolidation of brittle sandstones in architecture or the production of brake linings.

The binder according to the invention is suitable in particular for use in the production of components from granules, bulk materials and fibres of all types; for consolidating formations and excavations; for consolidating brittle sandstone, concrete, mortar and cement; for stabilization against water, such as, for example, for avoiding swelling on admission of water into geological formations of phyllosilicates; for sealing soil against water and chemicals (e.g. in landfills); for sealing formations in oil and gas wells; or for consolidating bulk materials and formations while maintaining porosity and permeability.

Examples which illustrate the invention but are in no way intended to limit it follow.

EXAMPLES

Preparation of Comparative Binder 13.64 g of 1 M HCl are added to 100.1 g of MTEOS and vigorously stirred. After the clearpoint, 65 g of a mixture of 47.85 g of Ti(OiPr)$_4$ and 18.03 g of (2-acetoacetoxy)ethyl methacrylate are added and the reaction solution is stirred for 2 h at room temperature. 178.5 g of DEGDMA are then added.

Preparation of Buffer 1.87 g of KOH are dissolved in 500 g of ethanol. 4.05 g of acetic acid are then added.

Preparation of Binder According to the Invention 76 mg of KOH are dissolved in 16.2 g of the previously prepared buffer. 24.4 g of the previously prepared comparative binder (pH=2) are added to this solution in order to prepare the binder. The proportion of the buffer in the binder is 40% by weight. The pH of the binder was 4.75.

Comparison of the Properties

The gelling time on curing and the uniaxial compressive strength (UCS) of cured moulded articles of the comparative binder and the binder according to the invention were investigated.

A. Gelling Time

The gelling time of the two binders was investigated under 2 different polymerization/curing conditions:

Polymerization 1: 1.1% by weight of free radical initiator, T=52° C.

Polymerization 2: 1.1% by weight of free radical initiator, T=52° C., presence of 1% by weight of very fine particles The results are summarized in the table below

| | Geling time | |
|---|---|---|
| | Comparative binder (pH ~2) | Binder according to the invention (pH = 4.75) |
| Polymerization 1 | 3.5 h | 4.5 h |
| Polymerization 2 | 150 min | 4.5 h |

With the binder according to the invention, substantially longer gelling times can be achieved, with the result that complete infiltration into a bulk material or formation is possible.

B. Compressive Strength

Sand was consolidated with a comparative binder and a binder according to the invention in order to obtain moulded articles of 5 cm length and 16 mm diameter. The binder of the invention corresponds to that described above, except that the binder contained 25% by weight of buffer instead of 40% by weight of buffer. The curing was effected with 1.1% by weight of free radical initiator, at 52° C. over 36 h. The uniaxial compressive strength (UCS) of the moulded article consolidated with the comparative binder and with the binder according to the invention was determined.

| | Comparative binder | Binder of the invention |
|---|---|---|
| UCS | 4.2 MPa | 7.0 MPa |

What is claimed is:

1. A binder for binding bulk materials and loose formations, wherein the binder comprises
   (A) a heterocondensate of at least one hydrolyzable silicon compound and at least one metal, phosphorus or boron compound, the metal being selected from Al, Ge, Sn, Pb, Ti, Mg, Li, V, Nb, Ta, Zr and Hf,
   (B) at least one organic polymerizable or polycondensable organic monomer or oligomer selected from monomers or oligomers which on polymerization afford polyisocyanates, melamine resins, polyesters or epoxy resins, and from monomers or oligomers of mono-, bi- or polyfunctional acrylates and methacrylates, styrene, styrene derivatives, vinylpyridine, and vinylbenzenesulfonic acid,
   (C) a buffer to adjust a pH of the binder to a value of from 4 to 6, and, optionally, a complexing agent.

2. The binder of claim 1, wherein the at least one hydrolyzable silicon compound comprises one or more hydrolyzable silicon compounds having at least one nonhydrolyzable group, or oligomers thereof.

3. The binder of claim 2, wherein the at least one nonhydrolyzable group is free of polymerizable units.

4. The binder of claim 1, wherein the buffer comprises a carboxylic acid and the conjugated base of the carboxylic acid.

5. The binder of claim 4, wherein the buffer comprises an acetic acid/acetate buffer.

6. The binder of claim 1, wherein the buffer comprises a complexing agent selected from organic acids and chelating agents.

7. The binder of claim 1, wherein (B) comprises a group that is capable of free radical polymerization.

8. The binder of claim 1, wherein the metal or boron compound comprises a complex ligand or (A) has been formed in the presence of a complex ligand.

9. The binder of claim 2, wherein the at least one nonhydrolyzable group of the hydrolyzable silicon compound comprises at least one of an alkyl group and an aryl group.

10. The binder of claim 1, wherein the metal, phosphorus or boron compound comprises at least one compound of one of B, Al, Sn, Ti, and Zr.

11. The binder of claim 1, wherein the metal, phosphorus or boron compound comprises at least one Ti compound.

12. The binder of claim 1, wherein a molar ratio of Si atoms to metal, phosphorus and boron atoms in the binder is from 10:1 to 1:3.

13. The binder of claim 1, wherein (A) is based on at least one hydrolyzable silicon compound having a nonhydrolyzable organic group without a polymerizable unit and at least one hydrolyzable silicon compound without nonhydrolyzable groups.

14. The binder of claim 1, wherein the binder comprises a polymerization initiator.

15. The binder of claim 14, wherein the polymerization initiator comprises a free radical initiator.

16. The binder of claim 15, wherein the polymerization initiator comprises at least one of a peroxide and an azo compound.

17. The binder of claim 1, wherein the binder further comprises at least one of a solvent and an additive.

18. The binder of claim 1, wherein the binder comprises a heterocondensate which is a metallo-, phosphoro- or borosiloxane and contains (i) units of heteroatoms selected from P, B, Al, Ge, Sn, Pb, Ti, Mg, Li, V, Nb, Ta, Zr and Hf that are incorporated into a siloxane skeleton via oxygen bridges, and (ii) siloxane units in which the silicon atom optionally has a nonhydrolyzable organic group without a polymerizable unit.

19. The binder of claim 1, wherein a weight ratio of heterocondensate to organic binder component, based on cured binder, is from 95:5 to 5:95.

20. The binder of claim 1, wherein (A) has been prepared in at least two stages, one or more hydrolyzable compounds having a relatively lower hydrolysis reactivity being prehydrolyzed in a first stage to afford a prehydrolyzate and one or more hydrolyzable compounds having a relatively higher hydrolysis reactivity being added to the prehydrolyzate in a final stage.

21. The binder of claim 1, wherein for preparing (A) the at least one hydrolyzable silicon compound has been mixed with water for hydrolysis, and the metal, phosphorus or boron compound has been added to a reaction mixture obtained after the water has been substantially consumed.

22. The binder of claim 1, wherein the binder is present as a sol.

23. The binder of claim 1, wherein the binder is particle-free.

24. The binder of claim 1, wherein the binder comprises a polysiloxane having at least one reactive group.

25. A method for consolidating a bulk or loose substrate, wherein the method comprises at least one of mixing and infiltrating the substrate with the binder of claim 1 and then curing the binder.

26. The method of claim 25, wherein the substrate comprises at least one of a geological formation, grit, a bulk material, soil, and rock.

27. The method of claim 25, wherein following curing, the substrate is sealed, voids in the substrate being filled with the binder.

28. The method of claim 25, wherein voids in the substrate remain open on consolidation, so that a permeability of unbound substrate is retained in a consolidated substrate.

29. The method of claim 25, wherein the substrate is freed from impurities by the binder.

30. The method of claim 25, wherein the binder is cured thermally.

31. A molded article, wherein the article comprises a finely divided, pulverulent or granular substrate that is bound with the cured binder of claim 1.

32. The molded article of claim 31, wherein the article is a porous article.

33. The molded article of claim 31, wherein the cured binder comprises an interpenetrating network (IPN) polymer.

* * * * *